(12) United States Patent
Oertley

(10) Patent No.: US 7,614,709 B2
(45) Date of Patent: Nov. 10, 2009

(54) TAPERED MASTER LINK DESIGN FOR TRACKED UNDERCARRIAGE

(75) Inventor: Thomas E. Oertley, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 109 days.

(21) Appl. No.: 11/700,197

(22) Filed: Jan. 31, 2007

(65) Prior Publication Data

US 2008/0179946 A1 Jul. 31, 2008

(51) Int. Cl.
*B62D 55/205* (2006.01)

(52) U.S. Cl. .................................. 305/186; 305/188

(58) Field of Classification Search ......... 305/180–182, 305/186–188, 190–191, 201, 204, 900
See application file for complete search history.

(56) References Cited

U.S. PATENT DOCUMENTS

| | | | |
|---|---|---|---|
| 3,427,079 A | 2/1969 | Skromme et al. | |
| 3,659,112 A | 4/1972 | Stedman | |
| 3,822,923 A | 7/1974 | Stedman | |
| 4,050,750 A | 9/1977 | Yoshihashi et al. | |
| 4,058,351 A | 11/1977 | Murphy | |
| 4,083,611 A | 4/1978 | Schaffner et al. | |
| 4,105,260 A | 8/1978 | Blunier et al. | |
| 4,262,973 A * | 4/1981 | Grilli et al. | 305/186 |
| 4,332,425 A | 6/1982 | Baylor | |
| 4,351,573 A | 9/1982 | Bedis et al. | |
| 4,361,364 A | 11/1982 | Brunn | |
| 4,365,848 A | 12/1982 | Grilli et al. | |
| 4,455,054 A | 6/1984 | Brunn | |
| 4,457,565 A | 7/1984 | Bissi et al. | |
| 4,579,394 A | 4/1986 | Bedis et al. | |
| 4,636,014 A | 1/1987 | Dennison et al. | |
| 4,775,198 A | 10/1988 | Bökamp et al. | |
| 6,412,887 B1 | 7/2002 | Ketting et al. | |
| 6,783,196 B2 | 8/2004 | Maguire et al. | |

FOREIGN PATENT DOCUMENTS

GB 2064450 * 6/1981 ................. 305/182

* cited by examiner

*Primary Examiner*—Jason R Bellinger
(74) *Attorney, Agent, or Firm*—Finnegan, Henderson, Farabow, Garrett & Dunner

(57) ABSTRACT

A master link for a chain is disclosed. The master link may have a first half link member, a second half link member, and a pin joining the first and second half link members. The master link may also have a shoe fixedly connected to the first half link member at a first tapered protrusion and fixedly connected to the second half link member at a second tapered protrusion.

18 Claims, 4 Drawing Sheets

TAPERED MASTER LINK DESIGN FOR TRACKED UNDERCARRIAGE

TECHNICAL FIELD

The present disclosure relates generally to a master link design for the tracked undercarriage of a mobile machine and, more particularly, to a master link design having tapered mating key and slot engagements.

BACKGROUND

A track type machine utilizes chains on either side of the machine that are connected to ground engaging elements known as shoes to move the machine. Specifically, a sprocket driven by an engine of the machine engages links of the chain to translate the chain about spaced apart pulley mechanisms. As the chain translates about the pulley mechanisms, the connected shoes engage a work surface under the machine to transmit torque from the sprocket to the surface in a direction opposite the desired travel direction of the machine, thereby propelling the machine. Depending on the weight of the machine, size of the chain, degrading environment in which the machine is operating, and other similar factors, the chains and/or shoes may wear or be damaged and require periodic inspection, servicing, repair, and/or replacement.

Typically, a master link is provided in the chain to allow disassembly of the chain (i.e., separation of two ends of the chain). The master link is available in many forms, but generally includes four half links (two half links per side), each of the half links receiving either a bushing or a pin. After the bushing and pin have been inserted into the half links, a flat upper surface of each half link abuts a flat lower surface of the shoe, and the entire assembly is bolted together with fasteners extending from an outer surface of the shoe into threaded holes within each half link. Although this type of joint has been successfully utilized on track type machines in the past, it suffers from durability problems. Specifically, the fasteners have been known to break or the threads within the half links have been known to strip. In these situations, the links of the chain may separate, leaving the machine stranded. Additionally, when the threads strip, the entire half link must be replaced. It is also possible, given the flat clamping surfaces of the shoe and half links, for the shoe to translate relative to the half links, requiring adjustment and/or replacement of the links and shoes.

An improved master link design is disclosed in U.S. Pat. No. 4,083,611 (the '611 patent) issued to Shaffner et al. on Apr. 11, 1978. In the '611 patent, Shaffner et al. describes and illustrates a master link assembly for a crawler tractor that comprises two laterally spaced apart (left and right) parallel master links. Each of the master links comprises two overlapping half links held in alignment by a pin extending into registering pin holes in the half links. The overlapping half links are mechanically secured together in fixed relationship by cap screws, which extend through holes in a track shoe that overlies both half links. The cap screws thread into tapped holes in the half links. Besides aligning the overlapping half links, each pin also serves as a safety connection in case the cap screws break, and also enables removal of the cap screws and replacement of the track shoe without breaking the track assembly. Axial displacement of a pin from its pin holes is prevented by arranging at least one tapped screw hole in each half link so that a cap screw, when fully inserted therein, engages a groove in the side of the pin and prevents axial movement of the pin out of the half link holes.

Although the improved master link design of the '611 patent may address some of the durability problems described above, the design has certain limitations. In particular, the half links and shoe of the '611 patent still abut along a generally planar surface. A planar abutment may be prone to misalignment during assembly and slippage during machine operation. In addition, because the cap screws still connect to threaded holes in the half links, when the threads strip, the half links must still be replaced, which can be an expensive and time consuming process.

The disclosed master link design is directed to overcoming one or more of the problems set forth above.

SUMMARY OF THE INVENTION

In one aspect, the present disclosure is directed to a master link for a chain. The master link may include a first half link member, a second half link member, and a pin joining the first and second half link members. The master link may also include a shoe fixedly connected to the first half link member at a first tapered joint and fixedly connected to the second half link member at a second tapered joint.

In another aspect, the present disclosure is directed to a method of connecting opposing ends of a chain. The method may include operatively linking movement of a first end of the chain to a second end of the chain in a length direction of the chain. The method may also include engaging the first end of the chain and the second end of the chain with a common linking member to prevent relative motion between the first and second ends of the chain in a first direction transverse to the length direction.

DETAILED DESCRIPTION

Figure 1:
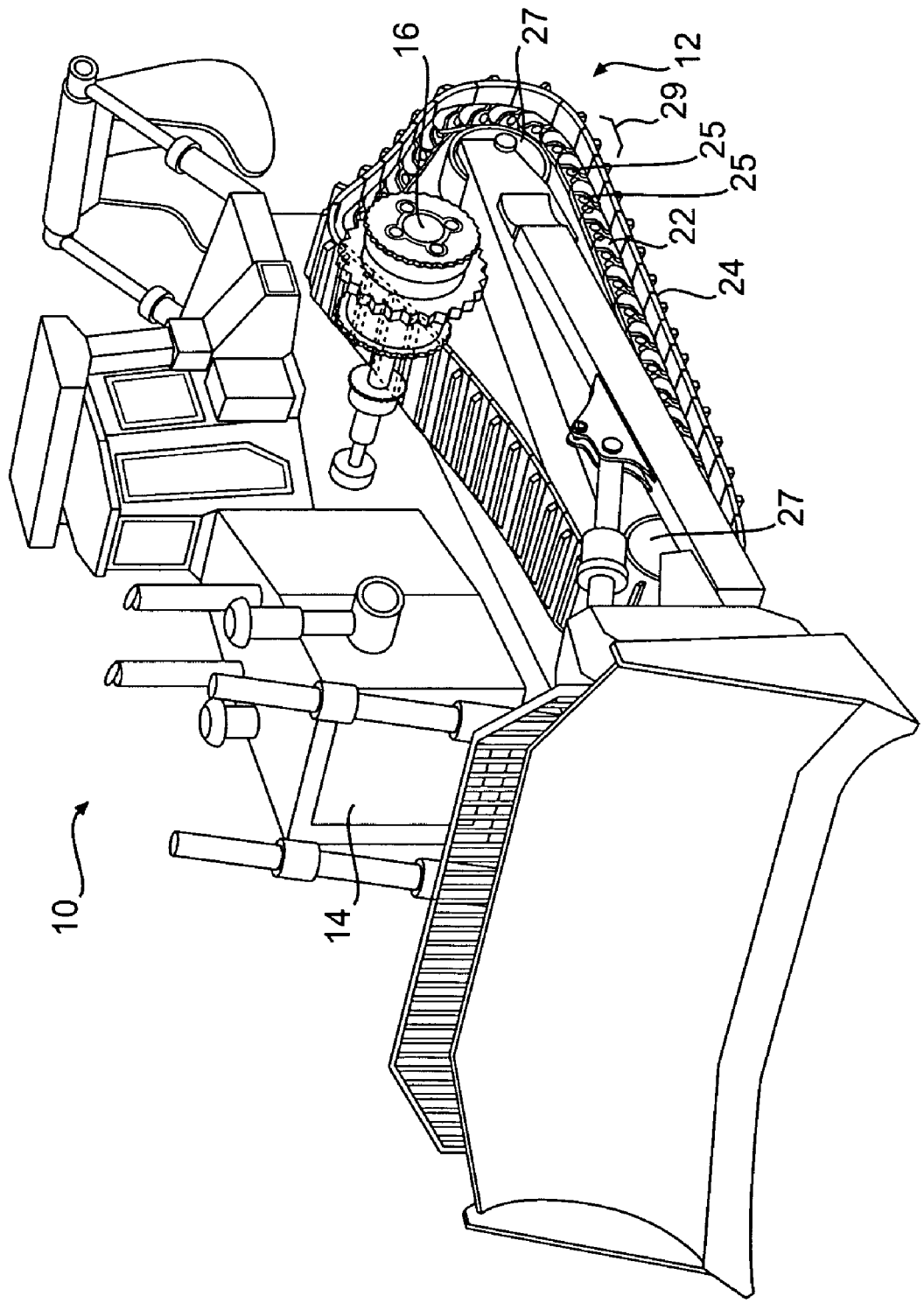
FIG. 1 is a pictorial illustration of an exemplary disclosed machine.

FIG. 1 illustrates a machine 10 having a power source 14 driving a tracked undercarriage 12. Machine 10 may be a mobile machine that performs some type of operation associated with an industry such as mining, construction, farming, or any other industry known in the art. For example, machine 10 may be an earth moving machine such as a dozer, a loader, an excavator, or any other earth moving machine.

Power source 14 may drive tracked undercarriage 12 of machine 10 at a range of output speeds and torques. Power source 14 may be an engine such as, for example, a diesel engine, a gasoline engine, a gaseous fuel-powered engine, or any other suitable engine. Power source 14 may also be a non-combustion source of power such as, for example, a fuel cell, a power storage device, or any other source of power known in the art.

Tracked undercarriage 12 may include tracks 20 (only one shown in FIG. 1) driven by power source 14 via sprockets 16 (only one shown in FIG. 1). Each track 20 may include a chain 22 with attached ground control devices called shoes 24. Each chain 22 may comprise a plurality of chain links 29 connected to each other by rods 25. Sprockets 16 may engage and transmit a torque to rods 25 to thereby cycle chain 22 about spaced apart pulley mechanisms 27.

Figure 2:
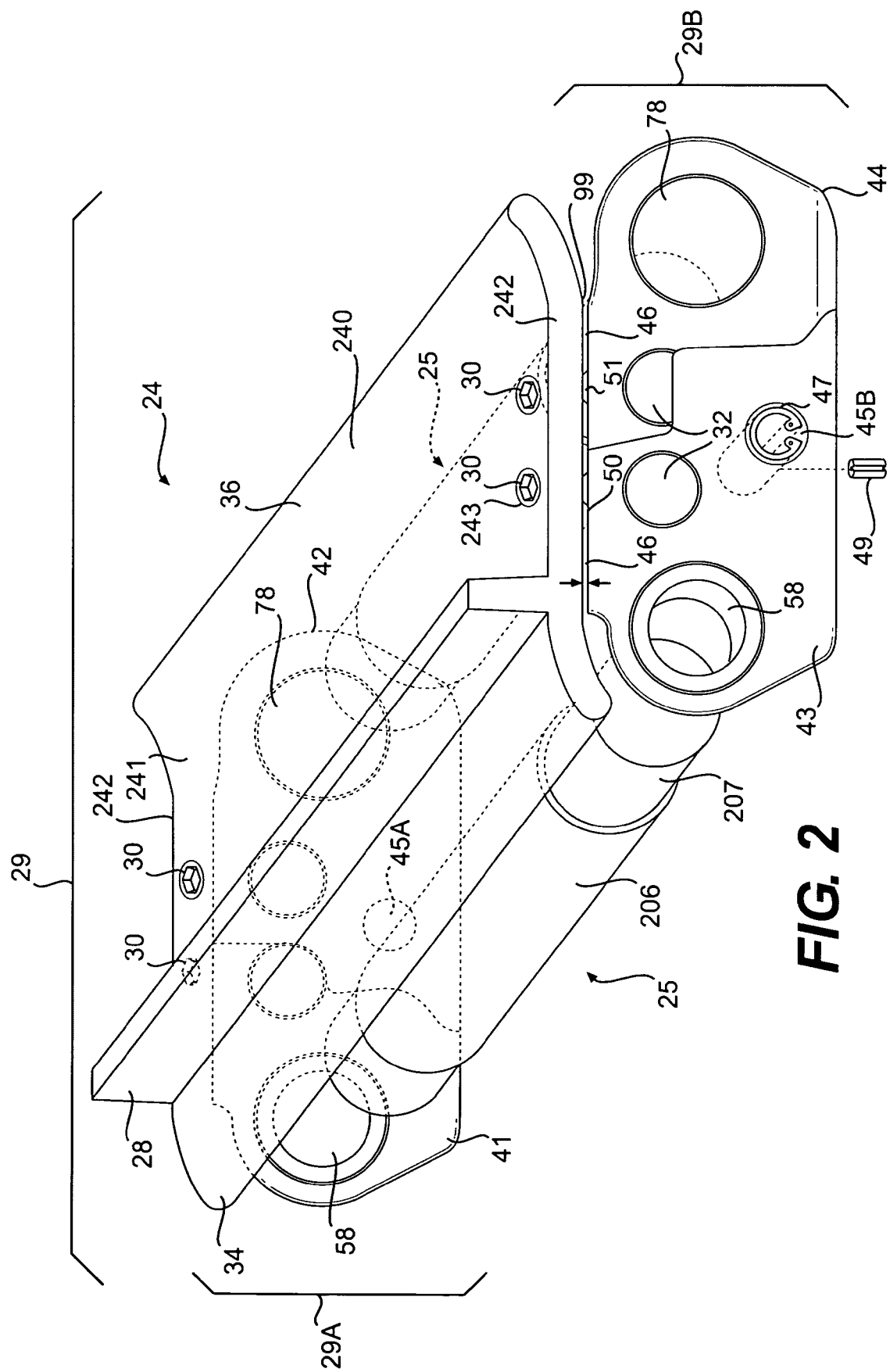
FIG. 2, is a pictorial illustration of an exemplary disclosed master link for use with a tracked undercarriage of the machine of FIG. 1.

As illustrated in FIG. 2, each link 29 may include two opposing sides 29A and 29B, a single shoe 24, and two rod members 25. Shoe 24 may be joined to opposing sides 29A and 29B by way of a plurality of threaded fasteners 30 and cylindrically shaped nuts 32. That is, each shoe 24 may be joined to side 29A of link 29 by substantially aligned (i.e. aligned in travel direction) threaded fasteners 30 and nuts 32. Each threaded fastener 30 may be a cap screw type of fastener recessed within a ground engaging surface of shoe 24. Each nut 32 may be generally cylindrically shaped, with a threaded bore 63 (shown in FIG. 4A) in an outer curved surface thereof to receive threaded fasteners 30. One nut 32 may be slidingly received by each of sides 29A and 29B.

One shoe 24 may be bolted to each pair of opposing link elements 29A and 29B. Shoe 24 may include a substantially rectangular planar base 240 spanning the opposing paired link elements 29A and 29B, and have a ground-engaging surface 241, an outwardly extending grouser bar 28, a leading edge 36, a trailing edge 34, opposing side edges 242 connecting leading edge 36 to trailing edge 34, inversely tapered slots 65 (shown in FIG. 4B) and through holes 243. Grouser bars 28 may be integrally formed with, welded to, or otherwise connected to a ground-engaging surface 241 of each shoe 24. Referring to FIG. 4B, inversely tapered slots 65 may be formed in shoe 24 to received tapered protrusions 51 of links 29A and 29B. Two through holes 243 may be substantially aligned with each side edge 242, but transversely spaced apart from each other relative to leading and trailing edges 36, 34. One threaded fasteners 30 may be received by each of the through holes 243 to fasten track shoe 24 to link elements 29A and 29B.

Each rod member 25 (referring back to FIG. 2) may include a bushing 206 sheathing a pin 207. Pin 207 may have a diameter less than that of bushing 206 such that pin 207 may freely rotate therein. Rod members 25 may be disposed between the first and second sides 29A, 29B of links 29 such that pin 207 passes through a bushing end hole 78 of one link 29 and is secured by pin end hole 58 of an adjacent link 29. This type of rod/link assembly may be repeated to create an endless chain 22. The rod members 25 may enable sprocket 16 to engage and exert force on each rod member 25 in a direction substantially perpendicular to the length direction of each rod member 25.

Each side 29A and 29B of link 29 may include two half link members. Specifically, a first half link member 41, a second half link member 42, a third half link member 43, and a fourth half link member 44, may form sides 29A and 29B, respectively. As described above, sides 29A and 29B may be disposed in opposition to each other and connected by rod members 25.

The half links 41, 42, 43, 44 of each side 29A and 29B may by joined to each other by way of a pin 45. Specifically, a first pin 45A and second pin 45B may join the half link members 41 and 42, and 43 and 44, respectively, to assist in alignment during assembly and to minimize translation in length direction of chain 22 during operation. The first and second pins 45A and 45B may be held in place by a snap ring 47 on either end or, alternatively, by a locking device such as a rolled pin 49 inserted radially through half links 41 and 43 and pins 45A and 45B. If a rolled pin 49 is utilized, the rolled pin 49 may be less than one-half the diameter of first pin 45A or second pin 45B so that, when first or second pins 45A or 45B are to be removed, rolled pin 49 may simply be pushed all the way into the respective first or second pin 45A or 45B.

Figure 3A:
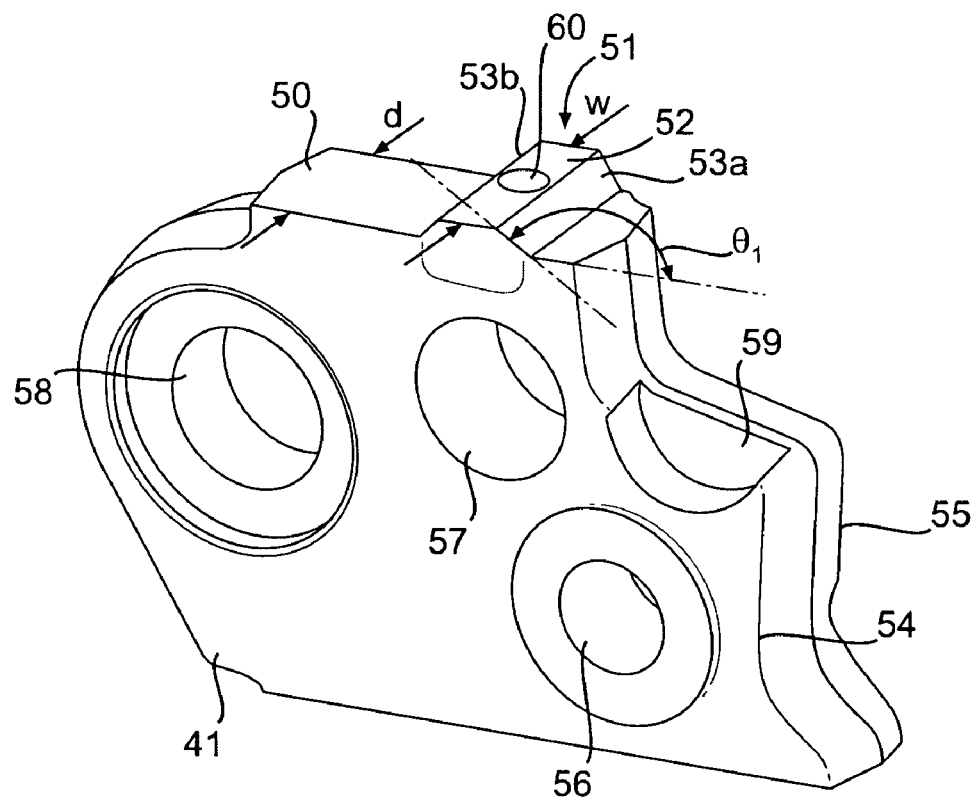
FIGS. 3A and 3B are pictorial illustrations of two exemplary half links, which, together, form one side of the master link of FIGS. 2, 4A, and 4B.

Referring to FIG. 3A, the depicted half link member 41 may be an exemplary embodiment of a pin end half of side 29A. Half link member 43 may include similar features and characteristics, but may comprise a mirror image of half link member 41 and be associated with side 29B. Half link member 41 may include an upper generally planar surface 50, a tapered protrusion 51, generally planar opposing side surfaces 54 and 55, a securing hole 56 for receiving pin 45A, a bore 57 for slidingly receiving nut 32, a pin end hole 58, and a threaded nut cut-out 59 for accommodating nut 32 of half link 42.

Tapered protrusion 51 may comprise a raised external flat surface 52 generally parallel to the upper planar surface 50 of half link 41, and two external flat sides 53a and 53b forming an obtuse angle $\theta_1$ with the upper planar surface 50. The transverse cross section of the tapered protrusion 51 may be substantially trapezoidal, when viewed from either of side surfaces 54 or 55. The width (W) of the tapered protrusion 51 may be greater than a distance (d) between the two generally planar side surfaces 54 and 55 of half link member 41. That is, tapered protrusion 51 may extend past both planar side surfaces 54 and 55. Tapered protrusion 51 may further define a through bore 60 to accommodate threaded fastener 30.

The threaded nut cut-out 59 may be a forged feature and situated primarily on the interior planar surface 54. The threaded nut cut-out 59 may be a substantially half moon shape and extend only partially through the width of half link 41, from planar surface 54 toward planar surface 55 to seat removable cylindrical nut 32 assembled into half link 42. In this manner, assembly of the paired half links 41 and 42 may be facilitated, as well as some resistance provided to relative translation between half links during machine operation. In other words, when half link 41 is assembled to half link 42, the threaded nut 32 joining half link 42 to shoe 24 may also engage the surfaces of cutout 59 to at least partially lock the movement of half link 41 to the movement of half link 42.

Figure 4A:
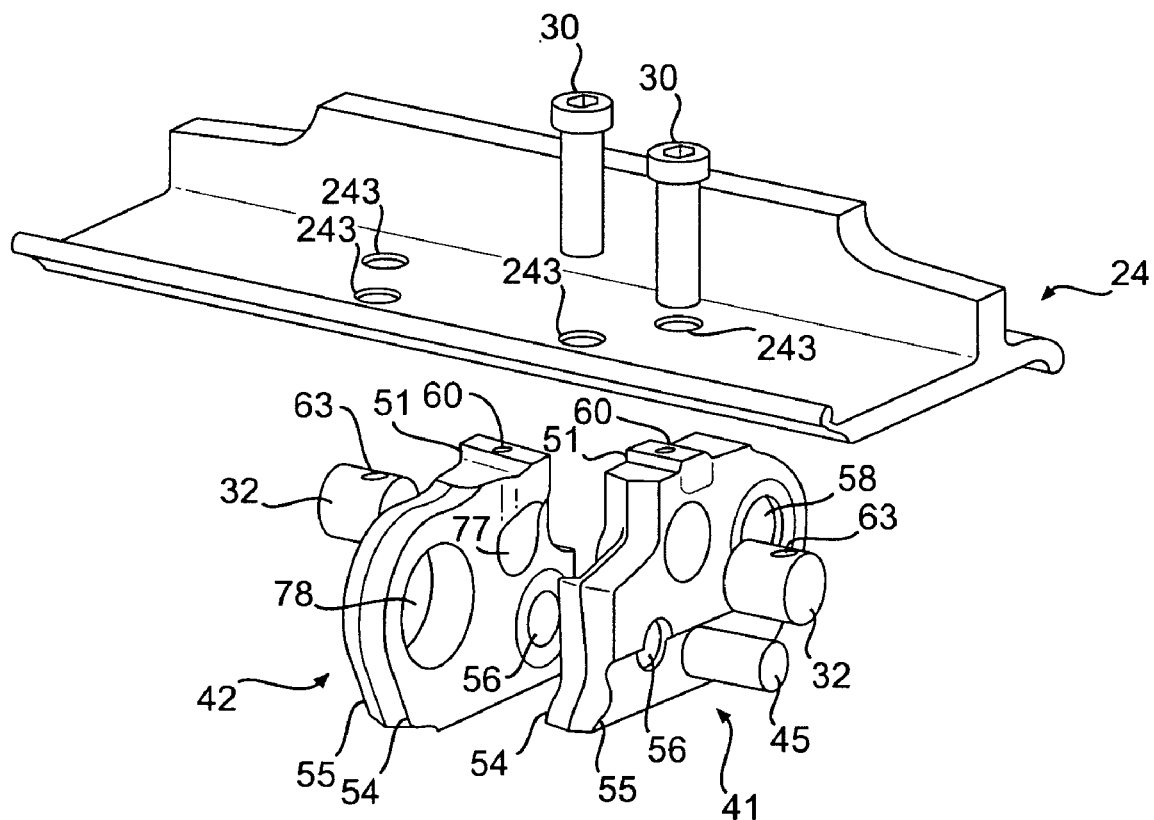
FIGS. 4A and 4B are both exploded view illustrations of the master link of FIG. 2.
Figure 4B:
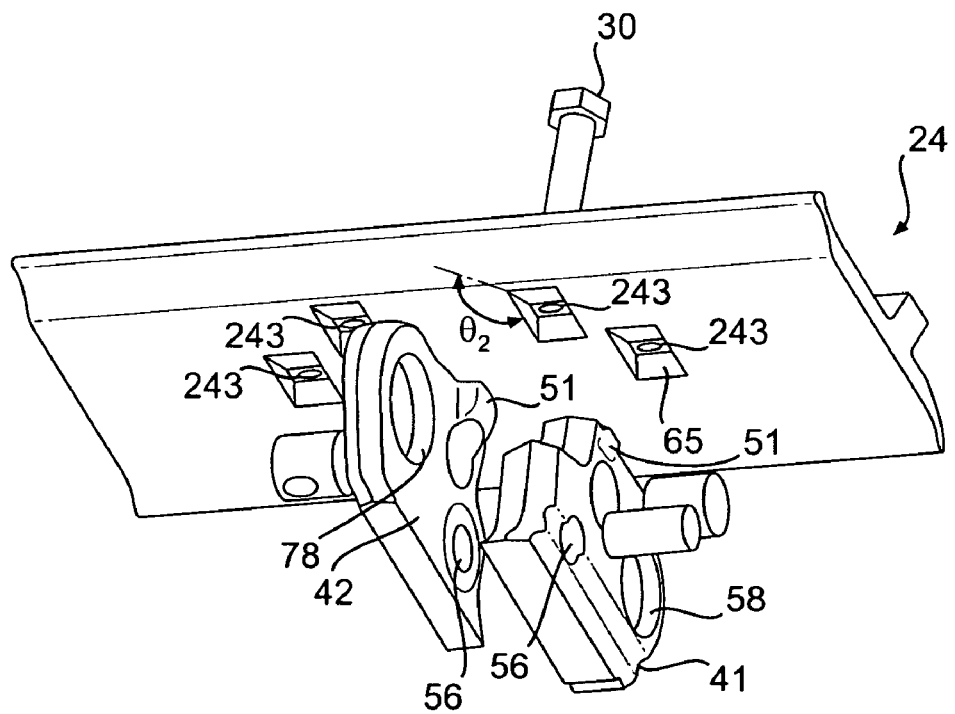

Referring to FIG. 4A, half link 41 may be connected to master shoe 24 by threaded fastener 30 and removable cylindrical nut 32. Threaded fastener 30 may extend from an outer surface of the master shoe 24, through the master shoe 24 at bore 243, into bore 60 and threadingly engage threaded bore 63 of already assembled removable cylindrical nut 32.

Figure 3B:
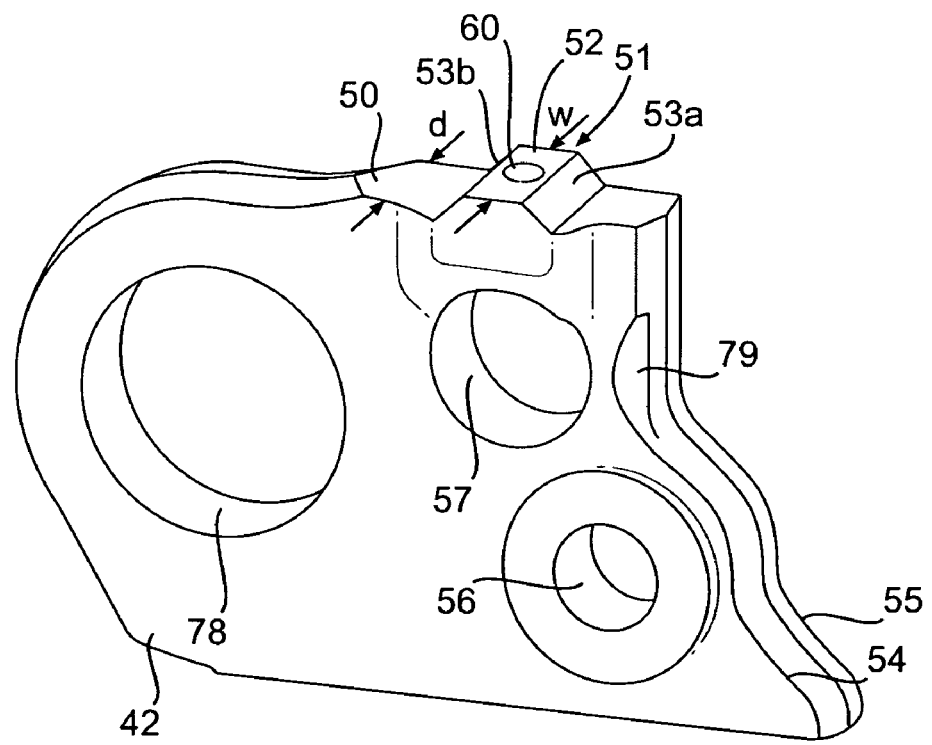

Referring now to FIG. 3B, the depicted half link 42 may be an exemplary embodiment of a bushing end half of side 29A. Half link member 44 may include similar features and characteristics as half link 42, and may comprise a mirror image of half link member 42 and be associated with side 29B. Half link 42 may include features similar to previously described half link 41 such as an upper generally planar surface 50, a tapered protrusion 51, generally planar side surfaces 54 and 55, a securing pin hole 56, and a threaded nut hole 57. However, in contrast to half link 41, half link 42 may include a bushing end hole 78 and a threaded nut cut-out 79.

The threaded nut cut-out 79, similar to the threaded nut cut-out 59, may be a forged feature and situated primarily on the interior planar surface 54. The threaded nut cut-out 79 may be substantially a vertically oriented quarter moon shape and extend only partially through the width of half link 42, from the planar surface 54 to seat removable cylindrical nut 32. In this manner, assembly of the paired half links 41 and 42 may be facilitated as well as some resistance provided to relative translation during machine operation. In other words, when half link 42 is assembled to half link 41, the threaded nut 32 joining half link 41 to shoe 24 may also engage the surfaces of cut-out 79 to at least partially lock the movement of half link 42 and the movement of half link 41.

Referring back to FIG. 2, when the first, second, third, and fourth half link members 41, 42, 43 and 44 are fixedly connected to the shoe 24, a space 46 may exist and be maintained between the upper planar surfaces 50 of the first, second, third, and fourth half link members 41, 42, 43, and 44 and a lower surface 99 of shoe 24. Space 46 may be maintained when height of tapered protrusion 51 is greater than depth of tapered slot 65. Space 46 may ensure that tapered ends of half links fully engage the inverse tapered slots 65 in shoe 24.

One embodiment of the present disclosure may contain two kinds of shoes, including a plurality of common shoes and a single master shoe 24 per track 20. In this embodiment, the common shoes may differ from the disclosed master shoe 24 in that the common shoes may have integral side members (i.e., no half link assemblies) and the lower shoe surface 99 may be substantially planar (i.e., no tapered slots 65). In an alternative embodiment, the disclosed shoe 24 may be utilized throughout track 20.

INDUSTRIAL APPLICABILITY

The system of the present disclosure may be applicable to any tracked vehicle where durability of the track is required. The improved master link system may improve durability of the tracked undercarriage by ensuring proper assembly and minimizing slip. Further, the present disclosure may reduce operating cost by allowing efficient replacement of low cost components in the event of a failure.

Referring to FIG. 4A, half links 41 and 43 may be operatively secured to half links 42 and 44 by way of pins 45A and 45B, respectively. First, second, third, and fourth half link members 41, 42, 43 and 44 may engage the master shoe 24 and act as a link 29, operatively linking movement of the first end of chain 22 to a second end of chain 22 in a length direction of the chain 22. As first, second, third, and fourth half link members 41, 42, 43 and 44 engage shoe 24, a space 46 may be maintained between the half links and the master shoe 24. Shoe 24 may also prevent relative motion between the first and second ends of the chain in a first direction transverse to the length direction.

Rod 25 may pass through a bushing end hole 78 of the first end of chain 22 and be mechanically secured by the pin end orifices 58 of half links 41 and 43, thereby operatively securing the first end of the chain to half links 41 and 43. Further, rod 25 may pass through the bushing end orifices 78 of half links 42 and 44 and be mechanically secured in the pin orifices 58 of the second end of chain 22, thereby operatively securing the second end of the chain to half links 42 and 44. Further, the first and second ends of chain 22 may be threadingly secured to shoe 24 to prevent further relative motion therebetween a second direction transverse to the length direction and substantially orthogonal to the first direction.

In the course of normal operation of machine 10, the removable cylindrical nut 32 of any the half link members 41, 42, 43 or 44 may be worn out or stripped, reducing its effectiveness in mechanically securing threaded fastener 30. Referring to FIG. 4A, in order to replace the removable cylindrical nut 32, an associated threaded fastener 30 may be removed from shoe 24 and any half link member 41, 42, 43 or 44. The removable cylindrical nut 32 may then be simply pushed out of half link member 41, 42, 43 or 44 and another new removable cylindrical nut 32 inserted and engaged with threaded fastener 30. The replacement of the removable cylindrical nut 32 may be completed while retaining the same assembled link 29. That is, pin 45A may retain the loosened half link in place, even though threaded fastener 30 has been removed. Because removable cylindrical nuts 32 may be replaced without replacing or disassembling half link members 41, 42, 43 or 44, repair operations related to stripped threaded fasteners 30 or removable cylindrical nuts 32 may be quicker and more efficient. And, because only the nut 32 must be replaced in the event of stripping rather than an entire half link 41, 42, 43 or 44, the cost of the replacement may be much less.

Because the tapered protrusions 51 of the half link members 41, 42, 43 and 44 secure in substantially inversely tapered slots 65, the mechanical connection between the half links 29A and 29B and master shoe 24 may allow significantly less slippage and movement when compared to planar abutments. This limited slippage and movement may substantially reduce wear on the components which may result in fewer necessary repairs, reducing the cost of operating and maintaining machine 10.

It will be apparent to those skilled in the art that various modifications and variations can be made to the disclosed master link and undercarriage. Other embodiments will be apparent to those skilled in the art from consideration of the specification and practice of the disclosed master link and undercarriage. It is intended that the specification and examples be considered as exemplary only, with a true scope being indicated by the following claims and their equivalents.

What is claimed is:

1. A master link for a chain, comprising:
a first half link member;
a second half link member;
a pin joining the first and second half link members; and
a shoe fixedly connected to the first half link member at a first tapered joint and fixedly connected to the second half link member at a second tapered joint, the shoe including a first tapered recess and a second tapered recess within a lower surface of the shoe;
the first tapered recess is configured to receive a tapered protrusion of the first half link member at the first tapered joint;
the second tapered recess is configured to receive a tapered protrusion of the second half link member at the second tapered joint; and
at least one threaded fastener extending from an outer surface of the shoe, through the shoe, and into at least one of the first and second half links; and
a threaded nut removably disposed within the at least one of the first and second half links and being configured to receive the at least one threaded fastener.

2. The master link of claim 1, further including:
a third half link member;
a fourth half link member; and
a second pin joining the third and fourth half link members, wherein the shoe is fixedly connected to the third half link member at a third tapered joint and fixedly connected to the fourth half link member at a fourth tapered joint.

3. The master link of claim 1, wherein:
the tapered protrusions of the first and second half link members protrude above an upper surface of each of the first and second half link members; and
when the first and second half links are fixedly connected to the shoe, a space exists between the upper surfaces of the first and second half links and the lower surface of the shoe.

4. The master link of claim 1, wherein:
the first and second half links each include two generally planar side surfaces disposed in parallel opposition to each other; and a width of the first and second protrusions is greater than the distance between the two generally planar side surfaces.

5. The master link of claim 1, wherein the threaded nut has a full circular cross section.

6. The master link of claim 1, wherein:
the at least one threaded fastener includes:
a first threaded fastener extending from the outer surface of the shoe, through the shoe, and into the first half link; and
a second threaded fastener extending from the outer surface of the shoe, through the shoe, and into the second half link;
the threaded nut is a first threaded nut removable disposed with the first half link to receive the first threaded fastener;
the master link includes a second threaded nut removably disposed within the second half link to receive the second threaded fastener;
the first half link includes a recess configured to accommodate the second threaded fastener; and
the second half link includes a recess configured to accommodate the first threaded fastener.

7. The master link of claim 1, wherein the at least one threaded fastener extends into the at least one of the first and second half links at the tapered protrusion.

8. The master link of claim 1, further including a locking device extending from a bottom surface of the first half link and into the pin for axial retention of the pin.

9. The master link of claim 8, wherein the locking device has a length less than a diameter of the pin.

10. A tracked undercarriage, comprising:
a first plurality of link members;
a second plurality of link members disposed in opposition to the first plurality of link members;
a plurality of rod members connecting the first and second plurality of link members to form a chain having a first end and a second end;
a plurality of shoe members fixedly connecting the first and second pluralities of link members;
a master link joining the first and second ends of the chain, the master link including:
a first half link member;
a second half link member;
a third half link member;
a fourth half link member;
a first pin joining the first and second half link members;
a second pin joining the third and fourth half link members;
a first master rod member joining the first and third half link members;
a second master rod member joining the second and fourth half link members; and
a master shoe fixedly connected to the first half link member at a first tapered joint, the second half link member at a second tapered joint, the third half link member at a third tapered joint, and the fourth half link member at a fourth tapered joints the master shoe including a first tapered recess, a second tapered recess, a third tapered recess, and a fourth tapered recess within a lower surface of the master shoe, wherein the first tapered recess is configured to receive a tapered protrusion of the first half link member at the first tapered joint, the second tapered recess is configured to receive a tapered protrusion of the second half link member at the second tapered joint, the third tapered recess is configured to receive a tapered protrusion of the third half link member at the third tapered joint, and the fourth tapered recess is configured to receive a tapered protrusion of the fourth half link member at the fourth tapered joint, wherein the first, second, third, and fourth half links each include two generally planar side surfaces disposed in parallel opposition to each other, and a width of the first, second, third, and fourth protrusions is greater than the distance between the two generally planar side surfaces of the respective first, second, third, and fourth half links.

11. The tracked undercarriage of claim 10, wherein when the first, second, third, and fourth half links are fixedly connected to the master shoe, a space exists between the upper surfaces of the first, second, third, and fourth half links and the lower surface of the master shoe.

12. The tracked undercarriage of claim 10, further including:
at least one threaded fastener extending from an outer surface of the master shoe, through the master shoe, and into at least one of the first, second, third, and fourth half links; and
a threaded nut removably disposed within the at least one of the first, second, third, and fourth half links and being configured to receive the at least one threaded fastener, wherein:
the threaded nut has a full circular cross section; and
the at least one threaded fastener extends into the at least one of the first, second, third, and fourth half links at the tapered protrusion.

13. A master link for a chain, comprising:
a first half link member;
a second half link member;
a pin joining the first and second half link members;
a shoe fixedly connected to the first half link member at a first tapered joint and fixedly connected to the second half link member at a second tapered joint; and
a locking device extending from a bottom surface of the first half link and into the pin for axial retention of the pin, the locking device having a length less than a diameter of the pin.

14. The master link of claim 13, wherein the shoe includes a first tapered recess and a second tapered recess within a lower surface of the shoe, the first tapered recess is configured to receive a tapered protrusion of the first half link member at the first tapered joint, and the second tapered recess is configured to receive a tapered protrusion of the second half link member at the second tapered joint.

15. The master link of claim 14, wherein the tapered protrusions of the first and second half link members protrude above an upper surface of each of the first and second half link members, and when the first and second half links are fixedly connected to the shoe, a space exists between the upper surfaces of the first and second half links and the lower surface of the shoe.

16. The master link of claim 14, wherein the first and second half links each include two generally planar side surfaces disposed in parallel opposition to each other, and a width of the first and second protrusions is greater than the distance between the two generally planar side surfaces.

17. The master link of claim 14, further including at least one threaded fastener extending from an outer surface of the shoe, through the shoe, and into at least one of the first and second half links and a threaded nut removably disposed within the at least one of the first and second half links and being configured to receive the at least one threaded fastener, wherein the threaded nut has a full circular cross section.

18. The master link of claim 13, wherein the shoe includes a first tapered recess and a second tapered recess within a lower surface of the shoe, wherein the first tapered recess is configured to receive a tapered protrusion of the first half link member at the first tapered joint and the second tapered recess is configured to receive a tapered protrusion of the second half link member at the second tapered joint, wherein at least one threaded fastener extends from an outer surface of the shoe, through the shoe, and into at least one of the first and second half links and a threaded nut is removably disposed within the at least one of the first and second half links and being configured to receive the at least one threaded fastener, wherein the at least one threaded fastener extends into the at least one of the first and second half links at the tapered protrusion.

* * * * *

UNITED STATES PATENT AND TRADEMARK OFFICE
CERTIFICATE OF CORRECTION

PATENT NO. : 7,614,709 B2  Page 1 of 1
APPLICATION NO. : 11/700197
DATED : November 10, 2009
INVENTOR(S) : Oertley It is certified that error appears in the above-identified patent and that said Letters Patent is hereby corrected as shown below:

Please correct the Drawings as follows:
Sheet 1 of 4, Line 1, in FIG. 1, above Reference Numeral "16" insert -- 20 --.

Signed and Sealed this

Sixth Day of April, 2010

David J. Kappos
*Director of the United States Patent and Trademark Office*